US010551866B2

(12) United States Patent
Henrikson

(10) Patent No.: US 10,551,866 B2
(45) Date of Patent: Feb. 4, 2020

(54) PEDAL ASSEMBLY WITH DEBRIS FILTERING MECHANISM

(71) Applicant: Kongsberg Power Products Systems I, Inc., Willis, TX (US)

(72) Inventor: Jesse L. Henrikson, Conroe, TX (US)

(73) Assignee: Kongsberg Power Products Systems I, Inc., Willis, TX (US)

(*) Notice: Subject to any disclaimer, the term of this patent is extended or adjusted under 35 U.S.C. 154(b) by 0 days.

(21) Appl. No.: 15/760,347

(22) PCT Filed: Sep. 16, 2016

(86) PCT No.: PCT/US2016/052156
§ 371 (c)(1),
(2) Date: Mar. 15, 2018

(87) PCT Pub. No.: WO2017/049099
PCT Pub. Date: Mar. 23, 2017

(65) Prior Publication Data
US 2019/0050018 A1 Feb. 14, 2019

Related U.S. Application Data

(60) Provisional application No. 62/220,507, filed on Sep. 18, 2015.

(51) Int. Cl.
G05G 25/04 (2006.01)
G05G 1/44 (2008.04)
(Continued)

(52) U.S. Cl.
CPC ............... G05G 25/04 (2013.01); G05G 1/38 (2013.01); G05G 1/44 (2013.01); G05G 1/445 (2013.01);
(Continued)

(58) Field of Classification Search
CPC .......... G05G 1/30; G05G 1/445; G05G 25/04; B60T 7/06
(Continued)

(56) References Cited

U.S. PATENT DOCUMENTS 2,125,446 A 8/1938 Hutt
3,451,288 A * 6/1969 Russell ..................... B60T 7/04
74/512
(Continued)

FOREIGN PATENT DOCUMENTS

CN 2647929 Y 10/2004
CN 101239617 A 8/2008
(Continued)

OTHER PUBLICATIONS

English language abstract for FR3008666 extracted from espacenet.com on Aug. 2, 2018; 2 pages.
(Continued)

Primary Examiner — Prasad V Gokhale
(74) Attorney, Agent, or Firm — Howard & Howard Attorneys PLLC

(57) ABSTRACT

A pedal assembly for a vehicle, including a pedal arm moveable between a first position and a second position, and a pivot shaft is operatively attached to the pedal arm. The pivot shaft defines a pivot axis. A housing having a mount adapted for attachment to the vehicle is provided. The housing defines a bore supporting at least a portion of the pivot shaft to permit rotation of the pedal arm about the pivot axis. A debris filtering mechanism is formed in at least one of the pivot shaft and the bore to direct contaminants away from the pedal assembly and out of the bore as the pedal arm moves between the first position and the second position.

21 Claims, 15 Drawing Sheets

(51) Int. Cl.
*G05G 1/445* (2008.04)
*G05G 1/38* (2008.04)
*G05G 5/05* (2006.01)
*B60K 20/04* (2006.01)
*B60K 26/02* (2006.01)
*B60T 7/06* (2006.01)

(52) U.S. Cl.
CPC ............... *G05G 5/05* (2013.01); *B60K 20/04* (2013.01); *B60K 26/02* (2013.01); *B60T 7/06* (2013.01)

(58) Field of Classification Search
USPC .......................................... 74/512, 560, 563
See application file for complete search history.

(56) References Cited

U.S. PATENT DOCUMENTS

| | | | |
|---|---|---|---|
| 3,494,673 A | 2/1970 | Wilcox | |
| 3,901,570 A | 8/1975 | Alexander | |
| 5,575,181 A | 11/1996 | Baumann | |
| 5,618,107 A | 4/1997 | Bartsch | |
| 5,829,317 A * | 11/1998 | Vreeken | B60T 7/06 74/560 |
| 6,220,222 B1 | 4/2001 | Kalsi | |
| 6,330,838 B1 | 12/2001 | Kalsi | |
| 6,431,021 B1 | 8/2002 | Djordjevic et al. | |
| 6,446,525 B1 * | 9/2002 | Borchers | B60K 23/02 384/428 |
| 6,453,768 B2 | 9/2002 | Wehner et al. | |
| 6,526,844 B1 * | 3/2003 | Weis | B60K 26/021 188/83 |
| 6,915,717 B2 | 7/2005 | Burgstaler et al. | |
| 6,938,754 B2 | 9/2005 | Kanaris | |
| 8,240,230 B2 | 8/2012 | Peniston et al. | |
| 8,939,045 B2 | 1/2015 | Yamaguchi et al. | |
| 9,188,163 B2 | 11/2015 | Isenberg et al. | |
| 9,360,882 B2 | 6/2016 | Kaijala et al. | |
| 9,811,108 B2 | 11/2017 | Kumamoto et al. | |
| 9,975,527 B2 | 5/2018 | Kawazu et al. | |
| 2001/0015110 A1 | 8/2001 | Scheidling et al. | |
| 2001/0015112 A1 | 8/2001 | Popowich | |
| 2003/0005791 A1 | 1/2003 | Elgart | |
| 2003/0025389 A1 | 2/2003 | Ersoy et al. | |
| 2005/0081676 A1 | 4/2005 | Kim | |
| 2008/0149411 A1 * | 6/2008 | Schlabach | G05G 1/38 180/315 |
| 2010/0107805 A1 | 5/2010 | Bryce | |
| 2012/0060642 A1 * | 3/2012 | Yamaguchi | B60T 7/06 74/560 |
| 2012/0148179 A1 | 6/2012 | Kondo et al. | |
| 2012/0272785 A1 | 11/2012 | Kaiser | |
| 2012/0279346 A1 | 11/2012 | Canavan | |
| 2013/0133472 A1 * | 5/2013 | Burguera Albizuri | G05G 1/44 74/560 |
| 2013/0283961 A1 | 10/2013 | Kaijala | |
| 2014/0090512 A1 | 4/2014 | Kaijala et al. | |
| 2014/0311275 A1 | 10/2014 | Kim et al. | |
| 2015/0096407 A1 | 4/2015 | Fuller et al. | |
| 2017/0227047 A1 * | 8/2017 | Fujiwara | F16C 17/105 |

FOREIGN PATENT DOCUMENTS

| | | |
|---|---|---|
| CN | 201099179 Y | 8/2008 |
| CN | 201261853 Y | 6/2009 |
| CN | 101634608 A | 1/2010 |
| CN | 201646485 U | 11/2010 |
| CN | 201816576 U | 5/2011 |
| CN | 201840793 U | 5/2011 |
| CN | 202098326 U | 1/2012 |
| CN | 102582524 A | 7/2012 |
| CN | 102634193 A | 8/2012 |
| CN | 202405687 U | 8/2012 |
| CN | 202414076 U | 9/2012 |
| CN | 202507935 U | 10/2012 |
| CN | 202518184 U | 11/2012 |
| CN | 202669783 U | 1/2013 |
| CN | 202686155 U | 1/2013 |
| CN | 103253146 A | 8/2013 |
| CN | 103253256 A | 8/2013 |
| CN | 103318162 A | 9/2013 |
| CN | 203264980 U | 11/2013 |
| CN | 203293999 U | 11/2013 |
| CN | 103481879 A | 1/2014 |
| CN | 203485766 U | 3/2014 |
| CN | 203601240 U | 5/2014 |
| CN | 203805706 U | 9/2014 |
| CN | 203834917 U | 9/2014 |
| CN | 203937106 U | 11/2014 |
| CN | 104228576 A | 12/2014 |
| CN | 203996484 U | 12/2014 |
| CN | 203996604 U | 12/2014 |
| CN | 204037350 U | 12/2014 |
| CN | 104358512 A | 2/2015 |
| CN | 204136968 U | 2/2015 |
| CN | 104448675 A | 3/2015 |
| CN | 104499927 A | 4/2015 |
| CN | 104553783 A | 4/2015 |
| CN | 104590021 A | 5/2015 |
| CN | 104709086 A | 6/2015 |
| CN | 104709249 A | 6/2015 |
| DE | 10336799 A1 | 3/2005 |
| DE | 102004057571 A1 | 6/2006 |
| DE | 102005004997 A1 | 8/2006 |
| DE | 202006016389 U1 | 12/2006 |
| DE | 102012213666 A1 | 2/2014 |
| EP | 0712511 A1 | 5/1996 |
| EP | 0714056 A1 | 5/1996 |
| EP | 1126353 A2 | 8/2001 |
| EP | 1128976 A1 | 9/2001 |
| EP | 1173353 A1 | 1/2002 |
| EP | 1237768 A1 | 9/2002 |
| EP | 1379416 A1 | 1/2004 |
| EP | 1391799 A1 | 2/2004 |
| EP | 1555179 A1 | 7/2005 |
| EP | 1654607 A1 | 5/2006 |
| EP | 1943577 A2 | 7/2008 |
| EP | 2053483 A1 | 4/2009 |
| EP | 2071426 A1 | 6/2009 |
| EP | 2075665 A1 | 7/2009 |
| EP | 2299245 A2 | 3/2011 |
| EP | 2370241 A1 | 10/2011 |
| EP | 2818962 A1 | 12/2014 |
| EP | 2826680 A1 | 1/2015 |
| FR | 2924973 A1 | 6/2009 |
| FR | 2946162 A1 | 12/2010 |
| FR | 3008666 A1 | 1/2015 |
| GB | 1128370 A | 9/1968 |
| JP | 2008195225 A | 8/2008 |
| KR | 100890995 B1 | 3/2009 |
| KR | 20090067353 A | 6/2009 |
| WO | 200035727 A1 | 6/2000 |
| WO | 02081277 A1 | 10/2002 |
| WO | 200431880 A1 | 4/2004 |
| WO | 2005006104 A1 | 1/2005 |
| WO | 2008023369 A2 | 2/2008 |
| WO | 2009087103 A1 | 7/2009 |
| WO | 2010146246 A1 | 12/2010 |
| WO | 2011054562 A1 | 5/2011 |
| WO | 2013052628 A2 | 4/2013 |
| WO | 2017049112 A1 | 3/2017 |
| WO | 2017049099 A9 | 5/2017 |

OTHER PUBLICATIONS

English language abstract and computer-generated translation for JP2008195225 extracted from espacenet.com on Jul. 31, 2018; 10 pages.

English language abstract and computer-generated translation for KR100890995 extracted from espacenet.com on Jul. 31, 2018; 4 pages.

(56) References Cited

OTHER PUBLICATIONS

English language abstract and computer-generated translation for KR20090067353 extracted from espacenet.com on Jul. 31, 2018; 4 pages.
English language abstract and computer-generated translation for WO0035727 extracted from espacenet.com on Jul. 31, 2018; 15 pages.
English language abstract and computer-generated translation for WO2004031880 extracted from espacenet.com on Aug. 1, 2018; 2 pages.
English language abstract for WO2005006104 extracted from espacenet.com on Aug. 3, 2018; 1 page.
English language abstract for WO02081277 extracted from espacenet.com on Aug. 2, 2018; 2 pages.
English language abstract for WO2009087103 extracted from espacenet.com on Aug. 1, 2018; 1 page.
English language abstract for WO2010146246 extracted from espacenet.com on Aug. 3, 2018; 2 pages.
English language abstract for WO2017049099 extracted from espacenet.com on Aug. 2, 2018; 2 pages.
International Search Report and Written Opinion for PCT/US2016/052174 dated Dec. 9, 2016; 11 pages.
International Search Report and Written Opinion for PCT/US2016/052156 dated Dec. 14, 2016; 8 pages.
English language abstract and computer-generated translation for CN2647929 extracted from espacenet.com on Jul. 31, 2018; 5 pages.
English language abstract and computer-generated translation for CN101239617 extracted from espacenet.com on Jul. 31, 2018; 6 pages.
English language abstract and computer-generated translation for CN101634608 extacted from espacenet.com on Jul. 31, 2018; 9 pages.
English language abstract and computer-generated translation for CN102582524 extracted from espacenet.com on Jul. 31, 2018; 4 pages.
English language abstract for CN102634193 extracted from espacenet.com on Jul. 31, 2018; 1 page.
English language abstract and computer-generated translation for CN103253146 extracted from espacenet.com on Jul. 31, 2018; 14 pages.
English language abstract for CN103318162 extracted from espacenet.com on Jul. 31, 2018; 1 page.
English language abstract for CN103481879 extracted from espacenet.com on Jul. 31, 2018; 1 page.
English language abstract and computer-generated translation for CN104228576 extracted from espacenet.com on Jul. 31, 2018; 7 pages.
English language abstract and computer-generated translation for CN104358512 extracted from espacenet.com on Jul. 31, 2018; 4 pages.
English language abstract for CN104448675 extracted from espacenet.com on Jul. 31, 2018; 1 page.
English language abstract and computer-generated translation for CN104499927 extracted from espacenet.com on Jul. 31, 2018; 4 pages.
English language abstract and computer-generated translation for CN104553783 extracted from espacenet.com on Jul. 31, 2018; 6 pages.
English language abstract and computer-generated translation for CN104590021 extracted from espacenet.com on Jul. 31, 2018; 4 pages.
English language abstract for CN104709086 extracted from espacenet.com on Aug. 2, 2018; 1 page.
English language abstract and computer-generated translation for CN104709249 extracted from espacenet.com on Jul. 31, 2018; 6 pages.
English language abstract and computer-generated translation for CN201099179 extracted from espacenet.com on Jul. 31, 2018; 5 pages.
English language abstract and computer-generated translation for CN201261853 extracted from espacenet.com on Jul. 31, 2018; 4 pages.
English language abstract and computer-generated translation for CN201646485 extracted from espacenet.com on Jul. 31, 2018; 6 pages.
English language abstract for CN201816576 extracted from espacenet.com on Jul. 31, 2018; 1 page.
English language abstract and computer-generated translation for CN201840793 extracted from espacenet.com on Jul. 31, 2018; 5 pages.
English language abstract and computer-generated translation for CN202098326 extracted from espacenet.com on Jul. 31, 2018; 4 pages.
English language abstract and computer-generated translation for CN202405687 extracted from espacenet.com on Jul. 31, 2018; 4 pages.
English language abstract and computer-generated translation for CN202414076 extracted from espacenet.com on Jul. 31, 2018; 7 pages.
English language abstract for CN202507935 extracted from espacenet.com on Jul. 31, 2018; 7 pages.
English language abstract and computer-generated translation for CN202518184 extracted from espacenet.com on Jul. 31, 2018; 4 pages.
English language abstract and computer-generated translation for CN202669783 extracted from espacenet.com on Jul. 31, 2018; 4 pages.
English language abstract and computer-generated translation for CN202686155 extracted from espacenet.com on Jul. 31, 2018; 4 pages.
English language abstract and computer-generated translation for CN203264980 extracted from espacenet.com on Jul. 31, 2018; 4 pages.
English language abstract and computer-generated translation for CN203293999 extracted from espacnet.com on Jul. 31, 2018; 4 pages.
English language abstract and computer-generated translation for CN203485766 extracted from espacenet.com on Jul. 31, 2018; 5 pages.
English language abstract and computer-generated translation for CN203601240 extracted from espacenet.com on Jul. 31, 2018; 5 pages.
English language abstract and computer-generated translation for CN203805706 extracted from espacenet.com on Jul. 31, 2018; 5 pages.
English language abstract and computer-generated translation for CN203834917 extracted from espacenet.com on Jul. 31, 2018; 7 pages.
English language abstract and computer-generated translation for CN203937106 extracted from espacenet.com on Jul. 31, 2018; 5 pages.
English language abstract and computer-generated translation for CN203996484 extracted from espacenet.com on Jul. 31, 2018; 4 pages.
English language abstract and computer-generated translation for CN203996604 extracted from espacenet.com on Jul. 31, 2018; 4 pages.
English language abstract for CN204037350 extracted from espacenet.com on Jul. 31, 2018; 1 page.
English language abstract and computer-generated translation for CN204136968 extracted from espacenet.com on Jul. 31, 2018; 5 pages.
English language abstract and computer-generated translation for DE10336799 extracted from espacenet.com on Jul. 31, 2018; 10 pages.
English language abstract and computer-generated translation for DE102004057571 extracted from espacenet.com on Jul. 31, 2018; 6 pages.
English language abstract and computer-generated translation for DE10200504997 extracted from espacenet.com on Jul. 31, 2018; 7 pages.

(56) References Cited

OTHER PUBLICATIONS

English language abstract and computer-generated translation for DE102012213666 extracted from espacenet.com on Jul. 31, 2018; 9 pages.
English language abstract and computer-generated translation for DE202006016389 extracted from espacenet.com on Jul. 31, 2018; 7 pages.
English language abstract for EP1379416 extracted from espacenet.com on Aug. 2, 2018; 1 page.
English language abstract and computer-generated translation for EP2826680 extracted from espacenet.com on Aug. 3, 2018; 11 pages.
English language abstract and computer-generated translation for FR2924973 extracted from espacenet.com on Jul. 31, 2018; 7 pages.
English language abstract for FR2946162 extracted from espacenet.com on Aug. 1, 2018; 1 page.

\* cited by examiner

PEDAL ASSEMBLY WITH DEBRIS FILTERING MECHANISM

CROSS-REFERENCE TO RELATED APPLICATIONS

The subject patent application is the National Stage of International Patent Application No. PCT/US2016/052156, filed on Sep. 16, 2016, which claims priority to and all the benefits of U.S. Provisional Patent Application Ser. No. 62/220,507, which was filed on Sep. 18, 2015, the disclosure of which is hereby incorporated by reference.

BACKGROUND OF THE INVENTION

1. Field of the Invention

The present invention relates, generally, to pedal assemblies for vehicles and, more specifically, to a pedal assembly with a debris filtering mechanism.

2. Description of the Related Art

Conventional pedal assemblies known in the art are employed to allow a driver to selectively control operation of a vehicle. To that end, pedal assemblies may be realized as an "accelerator pedal" used to control vehicle acceleration and modulate vehicle speed, a "brake pedal" used to control vehicle deceleration and stop the vehicle, or a "clutch pedal" used to modulate translation of rotational torque between an engine and a transmission.

It will be appreciated that certain types of vehicles are operated in harsh environments, such as is known in the construction, agriculture, recreational, and/or power sports industries. In these industries, the pedal assembly may occasionally be submerged in or otherwise exposed to a coarse slurry of water and mud/sand, or other contaminants. In such circumstances, the accumulation or presence of contaminants may be detrimental to proper operation of the pedal assembly, and frequently exacerbates wear of certain components of the pedal assembly, resulting in reduced life and inconsistent operation during subsequent use. Moreover, proper removal of contaminants may be cumbersome.

In order to overcome these disadvantages, pedal assemblies known in the related art may employ various seals, sealed bearings, and the like, arranged to inhibit passage of contaminants into the pedal assembly itself. However, these types of pedal assemblies tend to be relatively cumbersome and expensive to manufacture, and may be relatively heavy and require a large packaging size. While these conventional pedal assemblies have generally performed well for their intended use, there remains a need in the art for a pedal assembly which can operate consistently and reliably in different environments, and which can be manufactured and assembled in an efficient and cost-effective manor while, at the same time, affording minimal packaging size and component weight

SUMMARY OF THE INVENTION AND ADVANTAGES

The present invention overcomes the disadvantages in the prior art in a pedal assembly for a vehicle. The pedal assembly includes a pedal arm moveable between a first position and a second position. A pivot shaft is operatively attached to the pedal arm. The pivot shaft defines a pivot axis. A housing having a mount adapted for attachment to the vehicle is provided. The housing defines a bore supporting at least a portion of the pivot shaft to permit rotation of the pedal arm about the pivot axis. A debris filtering mechanism is formed in at least one of the pivot shaft and the bore to direct contaminants away from the pedal assembly and out of the bore as the pedal arm moves between the first position and the second position.

In this way, the pedal assembly of the present invention provides improved functionality and usability in connection with vehicles and, at the same time, reduces the cost and complexity of manufacturing and assembling pedal assemblies which can operate reliably and predictably in a number of different environments.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
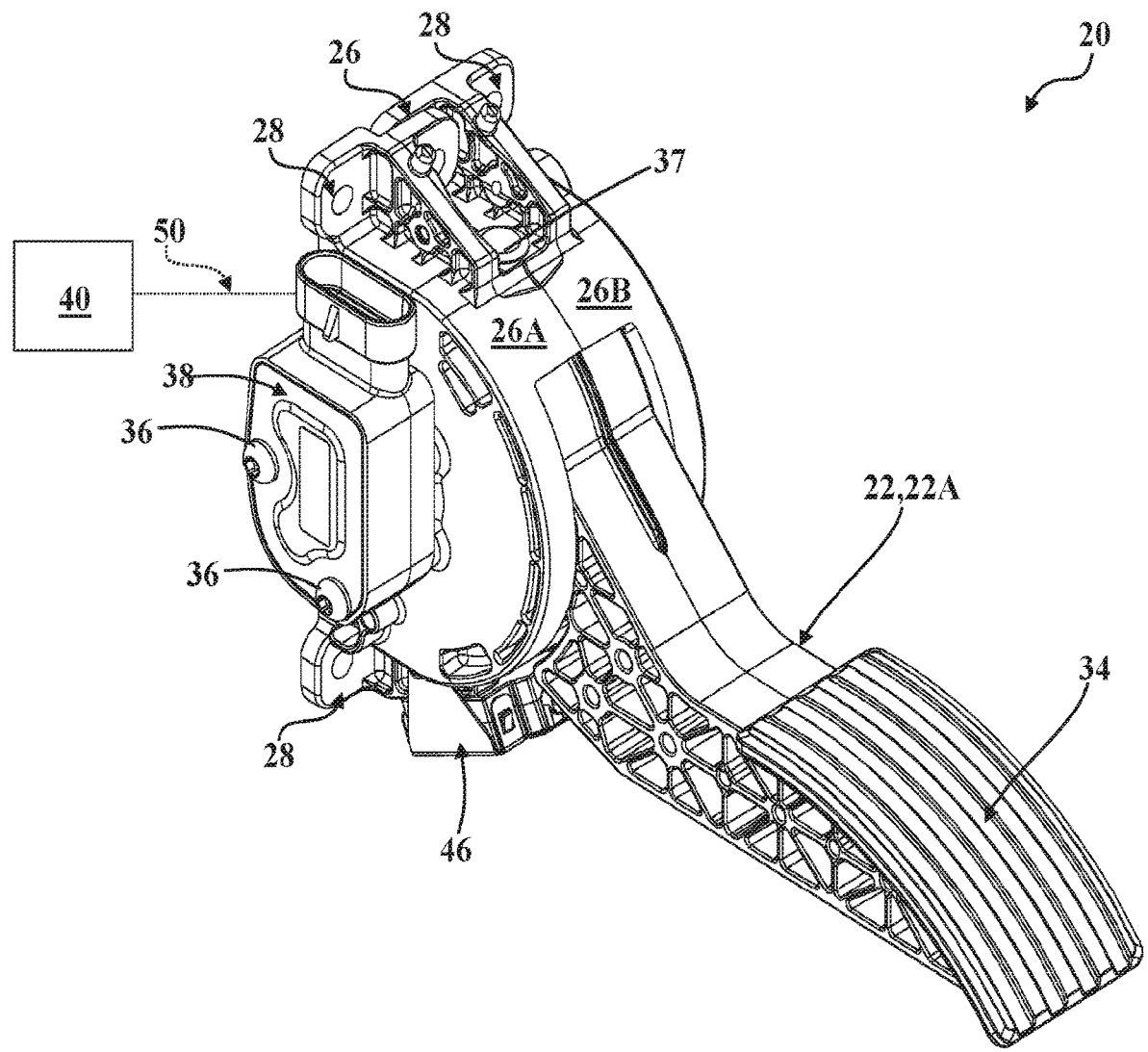
FIG. 1 is a perspective view of a pedal assembly having a debris filtering mechanism according to one embodiment of the present invention.
Figure 2:
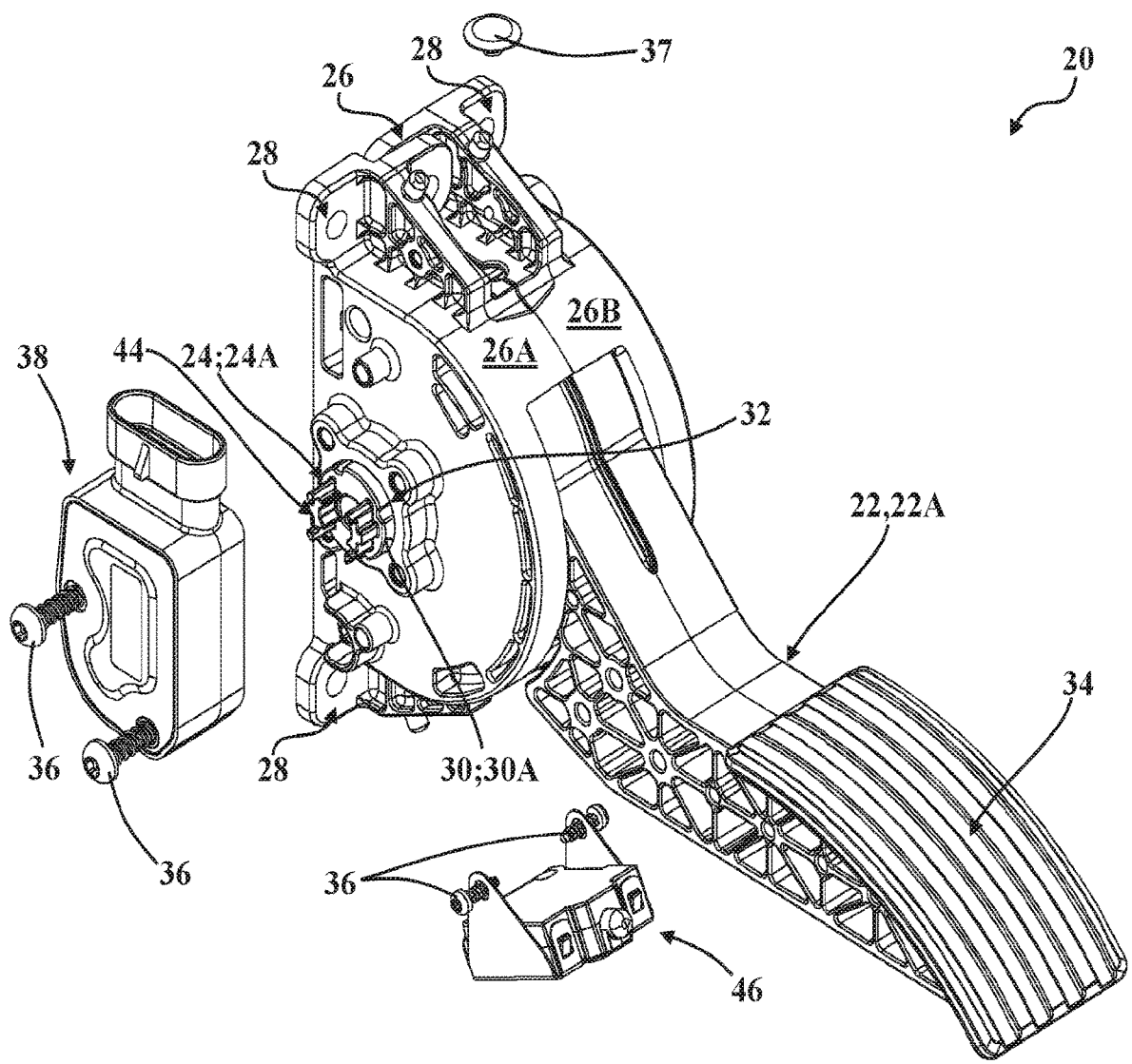
FIG. 2 is a partially exploded perspective view of the pedal assembly of FIG. 1, showing a pedal arm, a pair of housing components, a plug, and a sensor and a kickdown mechanism spaced from the first and second housing components.
Figure 3:
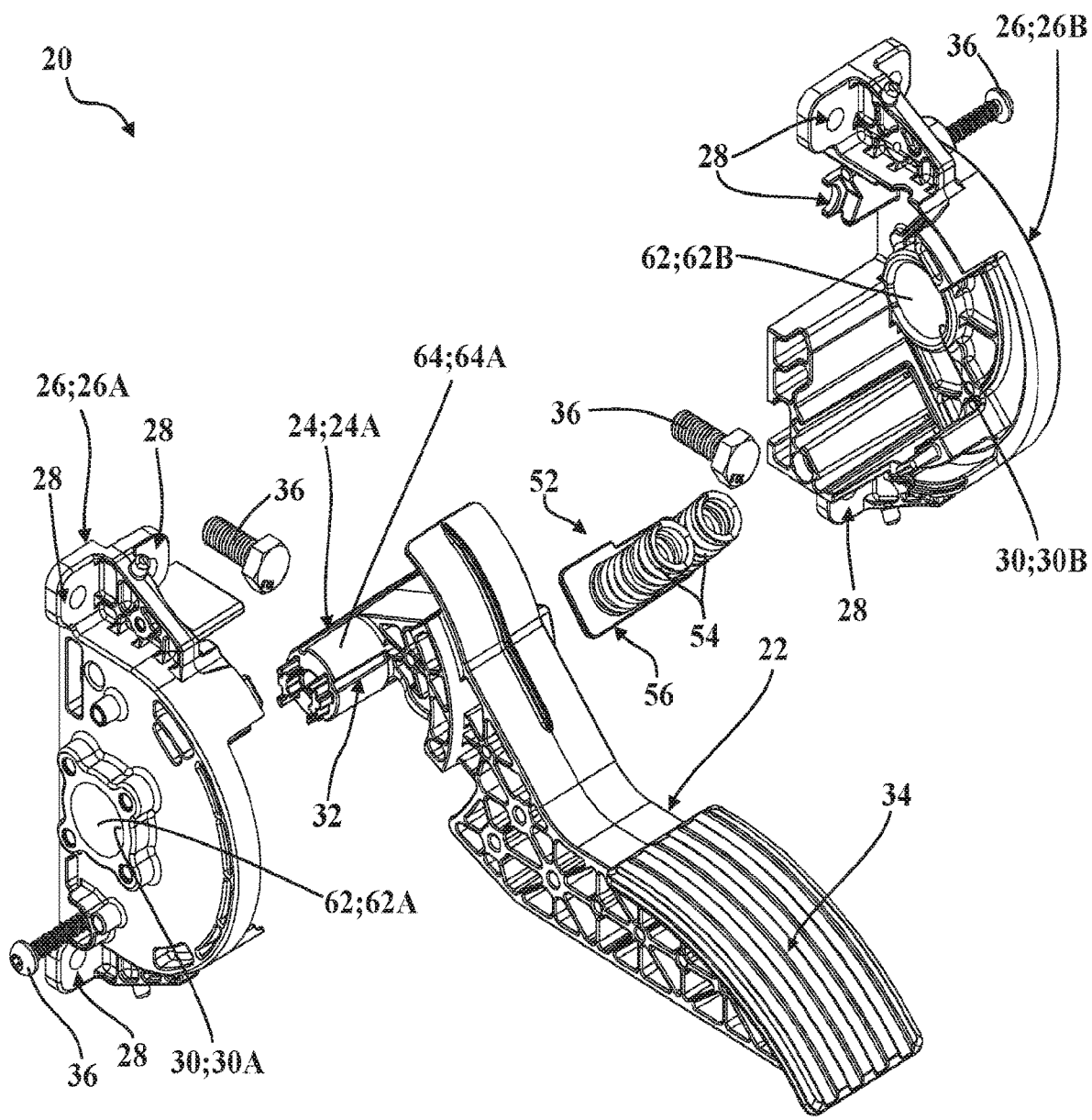
FIG. 3 is another partially exploded perspective view of the pedal assembly of FIG. 2, showing fasteners and a biasing mechanism interposed between the housing components and pedal arm.

Referring now to the drawings, where like numerals indicate like or corresponding parts throughout the several views, a pedal assembly is generally shown at 20 in FIGS. 1-3. The pedal assembly 20 is adapted for use in a vehicle (not shown, but generally known in the art) and allows a driver to selectively actuate the pedal assembly 20 so as to control the vehicle in operation, as described in greater detail below. To that end, the pedal assembly 20 could be realized as an "accelerator pedal" used to control vehicle acceleration and modulate vehicle speed, a "brake pedal" used to decelerate and stop the vehicle, a "clutch pedal" used to modulate translation of rotational torque between an engine and a transmission, and the like. Moreover, as will be appreciated from the subsequent description below, the pedal assembly 20 could be used to control the vehicle in any suitable way without departing from the scope of the present invention. While the pedal assembly 20 may advantageously be used to control vehicles that are operated in harsh environments, such as is known in the construction, agriculture, recreational, and/or power sports industries, those having ordinary skill in the art will appreciate that the vehicle could be of any suitable type or configuration without departing from the scope of the present invention. By way of non-limiting example, the vehicle could be a conventional All-Terrain Vehicle (ATV), a so-called "side-by-side" ATV, a tractor, a farming implement, a golf cart, an automotive vehicle, and the like.

Referring now to FIGS. 1-5B, the pedal assembly 20 includes a pedal arm 22, a pivot shaft 24, and a housing 26. The pedal arm 22 is movable between a first pedal position 22A (see FIG. 5A) and a second pedal position 22B (see FIG. 5B). The pivot shaft 24 is operatively attached to the pedal arm 22 and defines a pivot axis PA. The housing 26 has a mount, generally indicated at 28, which is adapted for attachment to the vehicle (not shown), and the housing 26 defines a bore 30 supporting at least a portion of the pivot shaft 24 to permit rotation of the pedal arm 22 about the pivot axis PA for movement between the first pedal position 22A and the second pedal position 22B. The pedal assembly 20 also includes a debris filtering mechanism, generally indicated at 32, formed in at least one of the pivot shaft 24 and the bore 30 to direct contaminants away from the pedal assembly 20 and out of the bore 30 as the pedal arm 22 moves between the first position 22A and the second position 22B. The pedal arm 22, the pivot shaft 24, the housing 26, the mount 28, the bore 30, and the debris filtering mechanism 32 will each be described in greater detail below.

The pedal arm 22 includes a pad 34 adapted for engagement by the vehicle driver such that force applied to the pad 34 moves the pedal arm 22 between the first position 22A and the second position 22B to effect corresponding operation of the vehicle. By way of non-limiting example, where the pedal assembly 20 is implemented as an "actuator pedal" used to actuate a throttle of an internal-combustion engine (not shown), the first position 22A could correspond to "engine idle" and the second position 22B could correspond to "wide-open throttle". However, as noted above, the pedal assembly 20 could be used in connection with a number of different applications and, thus, those having ordinary skill in the art will appreciate that the first position 22A and/or the second position 22B could correspond to any suitable operating condition of the vehicle without departing from the scope of the present invention.

As best shown in FIG. 5, the pedal arm 22, the pivot shaft 24, and the pad 34 are formed as a unitary, one-piece component manufactured such as via an injection molding process, with the pedal arm 22 arranged extending between the pivot shaft 24 and the pad 34. However, those having ordinary skill in the art will appreciate that the pedal arm 22 could be formed in any suitable way, from any number of components operatively attached in any suitable way, without departing from the scope of the present invention.

Figure 4:
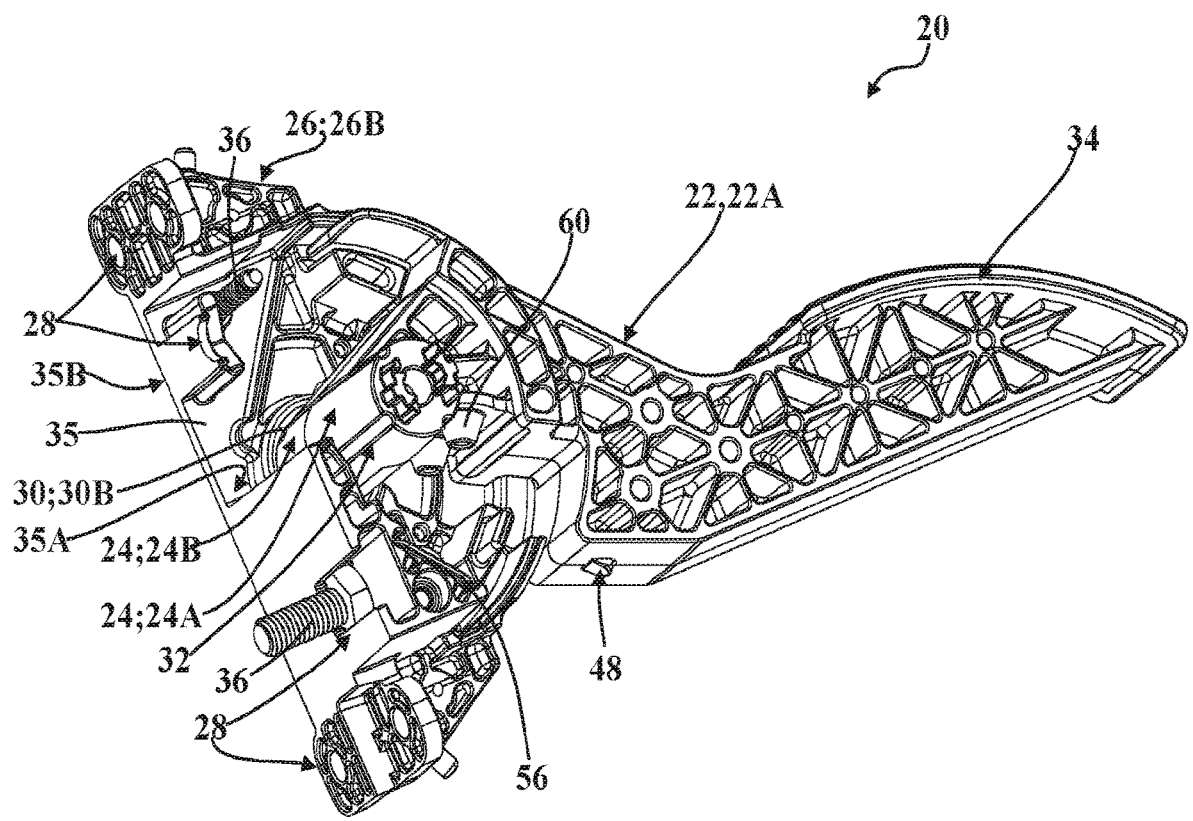
FIG. 4 is a perspective view of the pedal assembly of FIG. 3, showing the pedal arm, a portion of the biasing mechanism, and fasteners seated in one of the housing components.
Figure 5A:
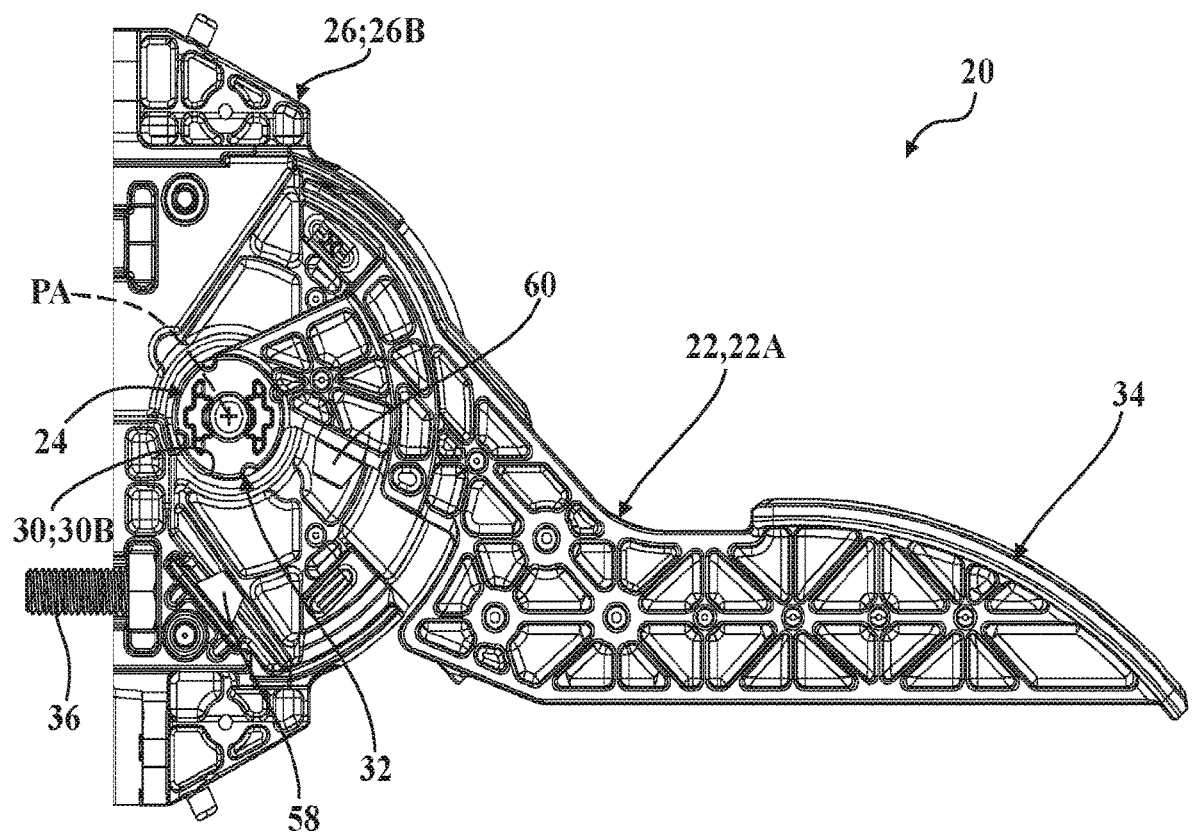
FIG. 5A is a left-side plan view of the components of the pedal assembly depicted in FIG. 4, shown with the pedal arm arranged in a first position.
Figure 5B:
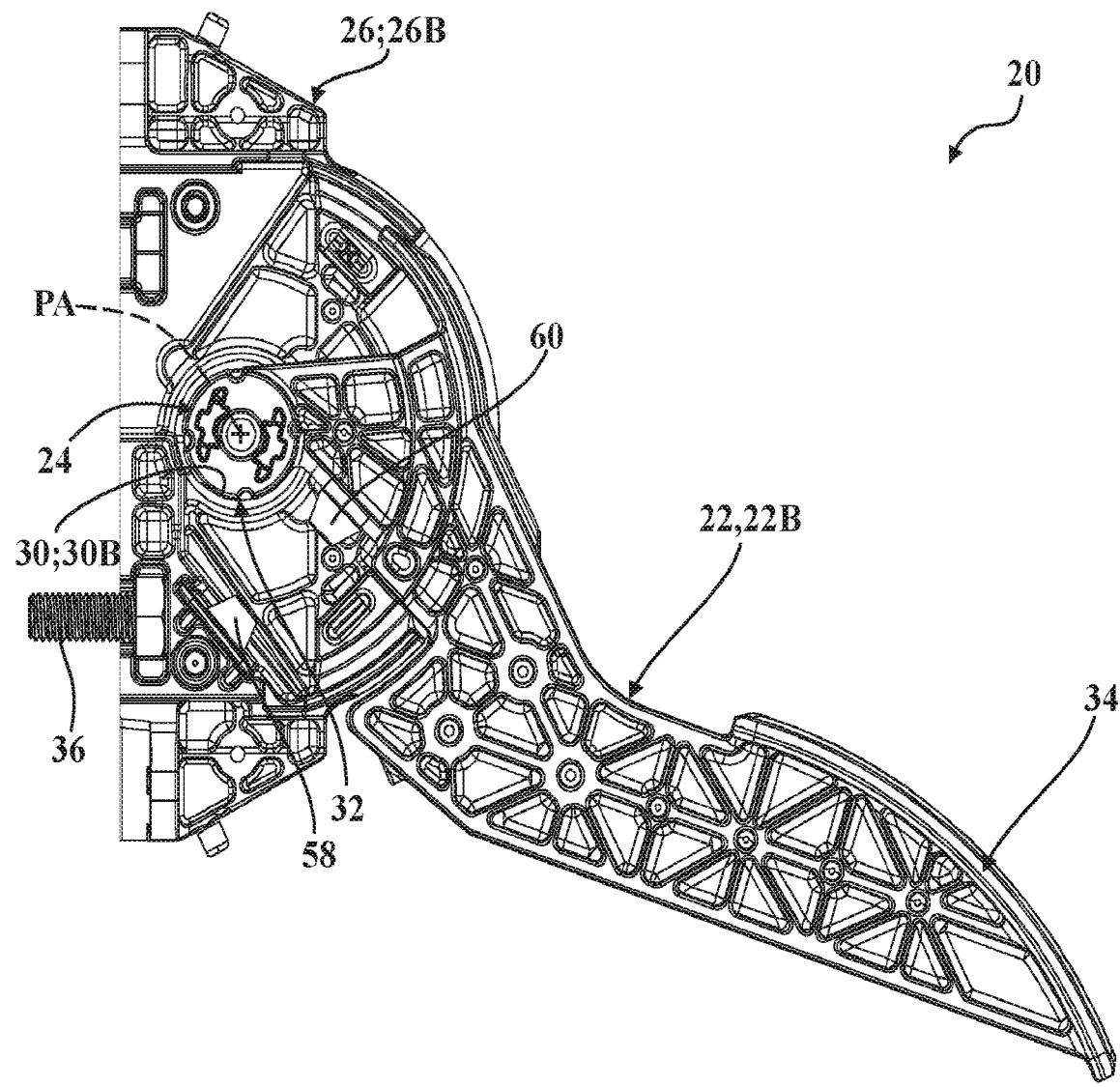
FIG. 5B is another left-side plan view of the components of the pedal assembly depicted in FIGS. 4-5A, shown with the pedal arm arranged in a second pedal position.
Figure 10A:
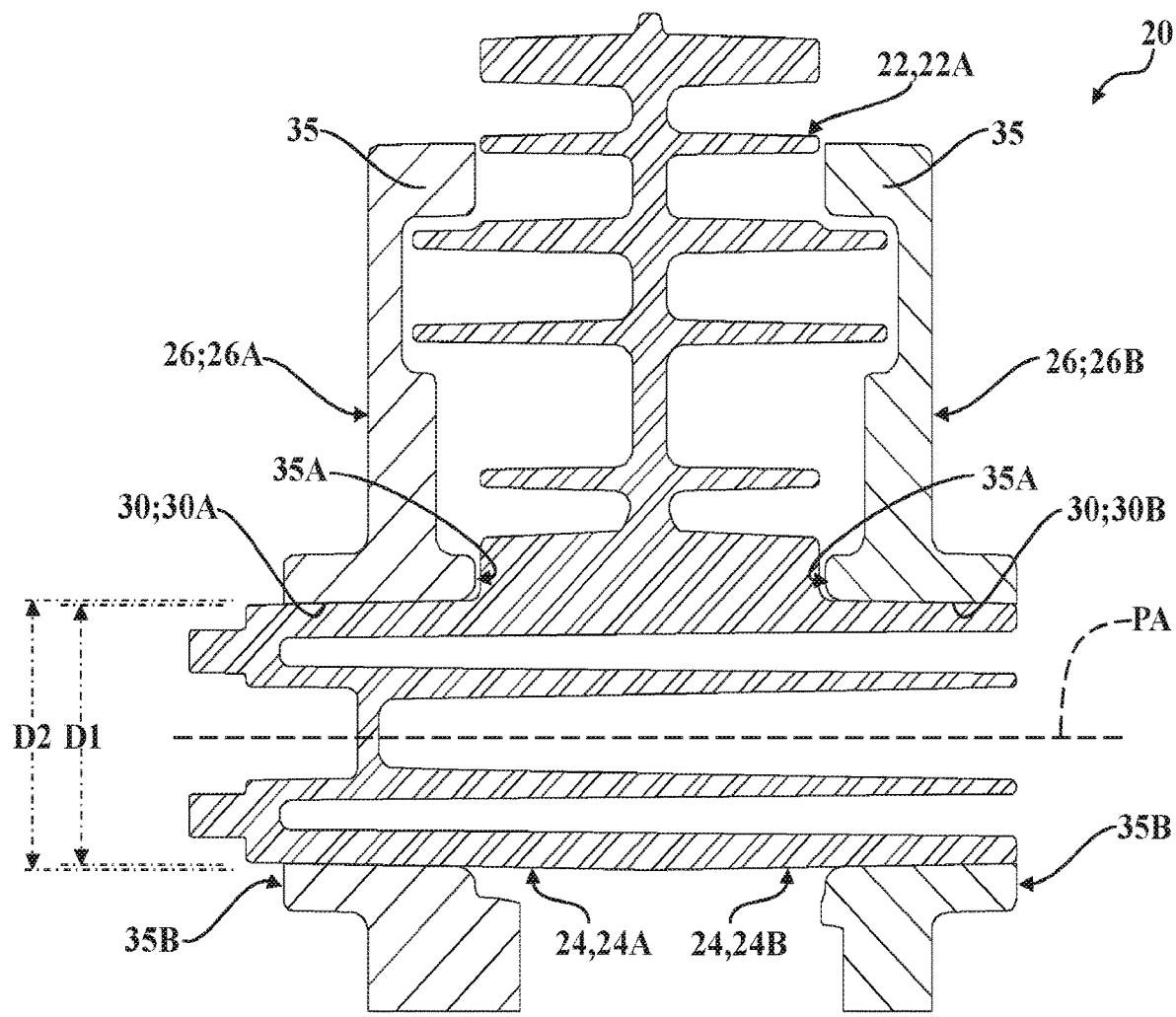
FIG. 10A is a slice sectional view taken along line 10A-10A of FIG. 9A.
Figure 10B:
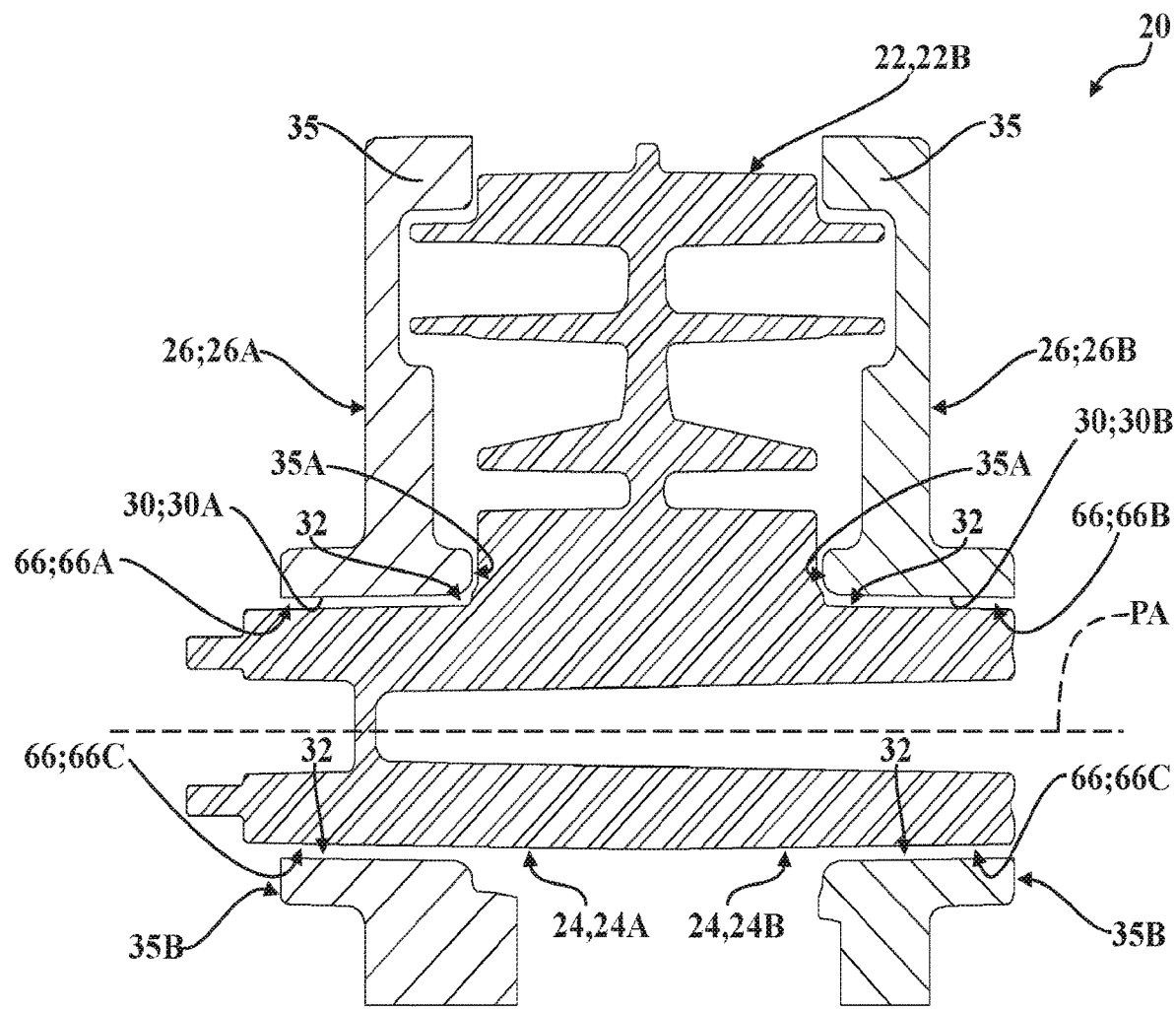
FIG. 10B is a slice sectional view taken along line 10B-10B of FIG. 9B.

As noted above, the housing 26 is employed to support the pivot shaft 24 and the pedal assembly 20 via the bore 30, and is configured for attachment to a portion of the vehicle (not shown). To this end, as shown in FIGS. 4, 10A, and 10B, the housing 26 has a body, generally indicated at 35, which defines an inner surface 35A and an outer surface 35B. The mount 28 is formed on the body 35 and, in the representative embodiment illustrated herein, is realized by various structural features which retain or accommodate fasteners 36 used to secure the pedal assembly 20 to a portion of the vehicle (not shown in detail). Here, one or more mounts 28 are formed integrally with the body 35, and the bore 30 is defined in the body 35. More specifically, the bore 30 is formed between the inner surface 35A and the outer surface 35B. As is described in greater detail below, in one embodiment, the debris filtering mechanism 32 is arranged to direct contaminants from the inner surface 35A towards the outer surface 35B as the pedal arm 22 moves between the first position 22A and the second position 22B.

In the representative embodiment illustrated herein, the housing 26 includes a first housing component 26A having a first bore 30A, and a second housing component 26B having a second bore 30B. Here, the pivot shaft 24 includes a first shaft portion 24A rotatably supported by the first bore 30A, and a second shaft portion 24B rotatably supported by the second bore 30B, to permit rotation of the pivot shaft 24 about the pivot axis PA as the pedal arm 22 moves between the first position 22A and the second position 22B. The first housing component 26A and the second housing component 26B are fixed together using one or more fasteners 36 (see FIGS. 2 and 3). However, those having ordinary skill in the art will appreciate that the housing 26 could include any suitable number of components arranged or attached in any suitable way sufficient to rotatably support the pivot shaft 24 via the bore 30, without departing from the scope of the present invention. The first housing component 26A, the second housing component 26B, and the pedal arm 22 are advantageously shaped and arranged so as to inhibit ingress of contaminants towards the pivot shaft 24. In certain embodiments, the pedal assembly 20 employs a plug 37 to further inhibit ingress of contaminants (see FIGS. 1 and 2).

Referring now to FIGS. 1 and 2, as noted above, the pedal assembly 20 is used to facilitate control of the vehicle in operation. To that end, the pedal assembly 20 may include at least one sensor, generally indicated at 38, and a controller, shown schematically at 40 in FIG. 1, arranged in communication with the at least one sensor 38. In the representative embodiment illustrated herein, the pedal assembly 20 employs a rotational position sensor 38.

The rotational position sensor 38 is mounted to the housing 26, such as via fasteners 36, and is adapted to determine the angular position of the pivot shaft 24 about the pivot axis PA. To that end, in one embodiment, the rotational position sensor 38 employs an emitter 42 (see FIG. 6), and the pivot shaft 24 includes at least one coupling, generally indicated at 44 (see FIG. 2), which is shaped to engage and rotate concurrently with the emitter 42 as the pedal arm 22 moves between the first position 22A and the second position 22B. Thus, the rotational position sensor 38 is configured to determine the angular position of the emitter 42 as the pedal arm 22 moves with respect to the housing 26. In the representative embodiment illustrated in FIG. 6, a shield and a pair of emitters realized as magnets are shown and are adapted for attachment to the coupling 44 on the pivot shaft 24 for concurrent rotation about the pivot axis PA, such as via cold staking (not shown). In the representative embodiment illustrated herein, the pivot shaft 24 includes a single coupling 44 configured to receive the emitter 42, and the sensor 38 is operatively attached to the first housing component 26A. However, those having ordinary skill in the art will appreciate that the pivot shaft 24 could be implemented with more than one coupling 44 such that the emitter 42 and sensor 38 could be arranged differently, such as to facilitate mounting the sensor 38 to the second housing component 26B (not shown). Similarly, it will be appreciated that the sensor 38 could be arranged, clocked, or otherwise oriented in different ways depending on application requirements.

In one embodiment, the pedal assembly 20 includes a kickdown mechanism, generally indicated at 46. The kickdown mechanism 46 is mounted to the housing 26, such as via fasteners 36, and is adapted to provide the vehicle driver with feedback as the pedal arm 22 approaches the second position 22B. To this end, the pedal arm 22 is provided with an engagement surface 48 (see FIG. 4) arranged to abut the kickdown mechanism 46 to translate force from the kickdown mechanism 46 to the pedal arm 22 when approaching the second position 22B. It will be appreciated that the kickdown mechanism 46 could be configured in a number of different ways without departing from the scope of the present invention.

Similarly, it will be appreciated that the sensor 38 could be of any suitable type or configuration without departing from the scope of the present invention. The sensor 38 and controller 40 are disposed in electrical communication, such as by one or more wires 50, and cooperate to control the vehicle in response to changes in the position of the pedal arm 22. Here, as the driver of the vehicle actuates the pedal arm 22, the rotational position sensor 38 communicates the angular position of the pedal arm 22 to the controller 40 which, in turn, subsequently controls the vehicle in response, as noted above. By way of non-limiting example, where the pedal assembly 20 is implemented as an "accelerator pedal," the controller 40 could actuate an electronic throttle valve used to control an internal combustion engine used to propel the vehicle (not shown, but generally known in the art). Those having ordinary skill in the art will recognize this as a so-called "drive-by-wire" accelerator and throttle arrangement commonly utilized by conventional internal-combustion propelled vehicles of the type described above. Similarly, where the pedal assembly 20 is implemented as a "clutch pedal," the controller 40 could limit or otherwise control engine operation in response to signals from the sensor 38 indicating disengagement between the engine and the transmission. It will be appreciated the pedal assembly 20 could control the vehicle in other ways, with or without the use of the sensor 38, controller 40, and/or kickdown mechanism 46, without departing from the scope of the present invention. By way of non-limiting example, while the representative embodiment of the pedal assembly 20 illustrated herein is realized as an electronic pedal assembly 20 with the sensor 38 disposed in communication with the controller 40, the pedal assembly 20 could be realized as a mechanical pedal assembly, such as with a coupling arranged in force-translating relationship with a cable, linkage, and the like, arranged to effect control of the vehicle (not shown).

Figure 6:
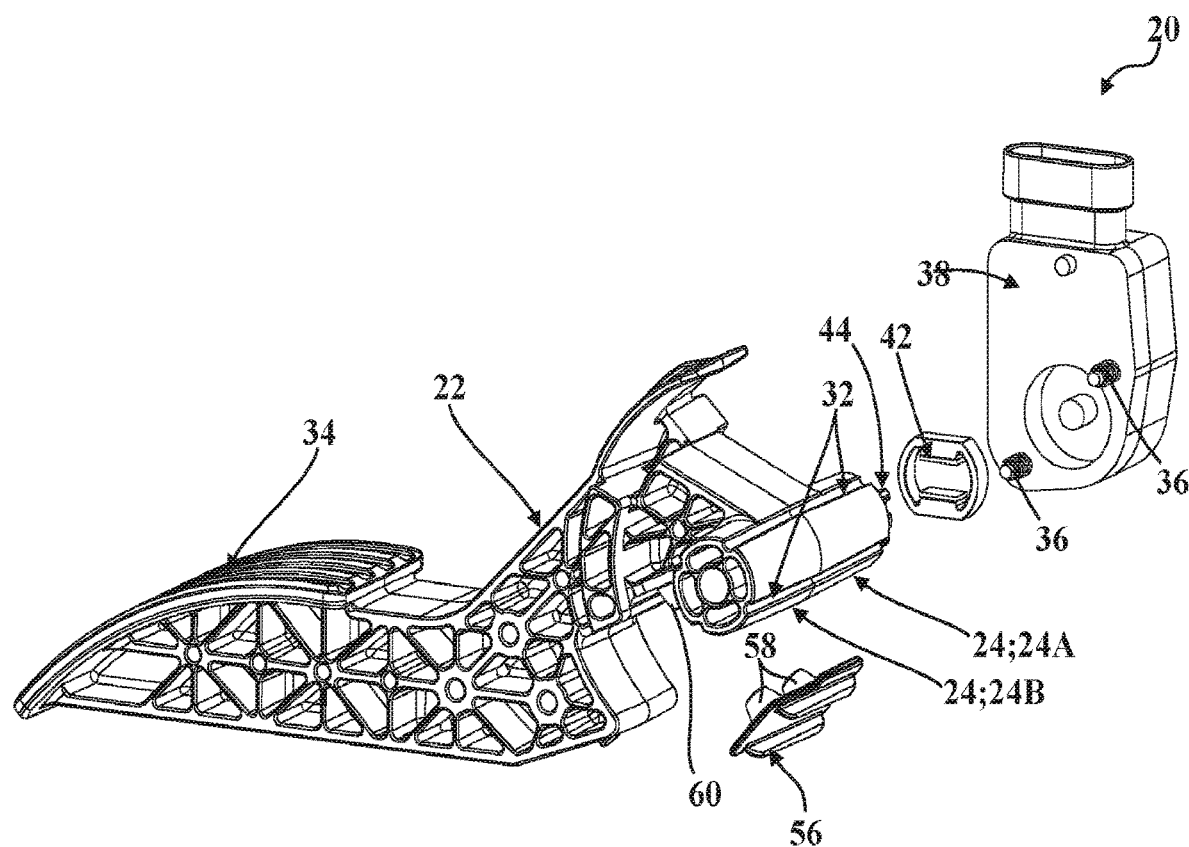
FIG. 6 is another perspective view of the pedal assembly of FIGS. 1-5B, showing the pedal arm, the sensor with an emitter and associated fasteners, and a portion of the biasing mechanism.

As is best shown in FIGS. 3, 4, and 6, the pedal assembly 20 employs a biasing mechanism, generally indicated at 52, interposed between the pedal arm 22 and the housing 26. The biasing mechanism 52 is configured so as to urge the pedal arm 22 towards the first position 22A in absence of force applied to the pedal arm 22, such as via the pad 34. The biasing mechanism 52 includes a biasing element 54, such as one or more arcuate compression springs, and a bias plate 56 supporting the biasing element 54 interposed between the housing components 26A, 26B and the pedal arm 22 (see FIGS. 3 and 6). Here, the bias plate 56 is formed as a separate component from the housing 26 and is supported between or otherwise captured by at least one of the housing components 26A, 26B. The bias plate 56 has at least one bias projection 58, and the pedal arm 22 has at least one arm projection 60, both of which are shaped to retain the biasing element 54 in operation. However, those having ordinary skill in the art will appreciate that the pedal arm 22 could be biased in other ways without departing from the scope of the present invention.

Figure 7:
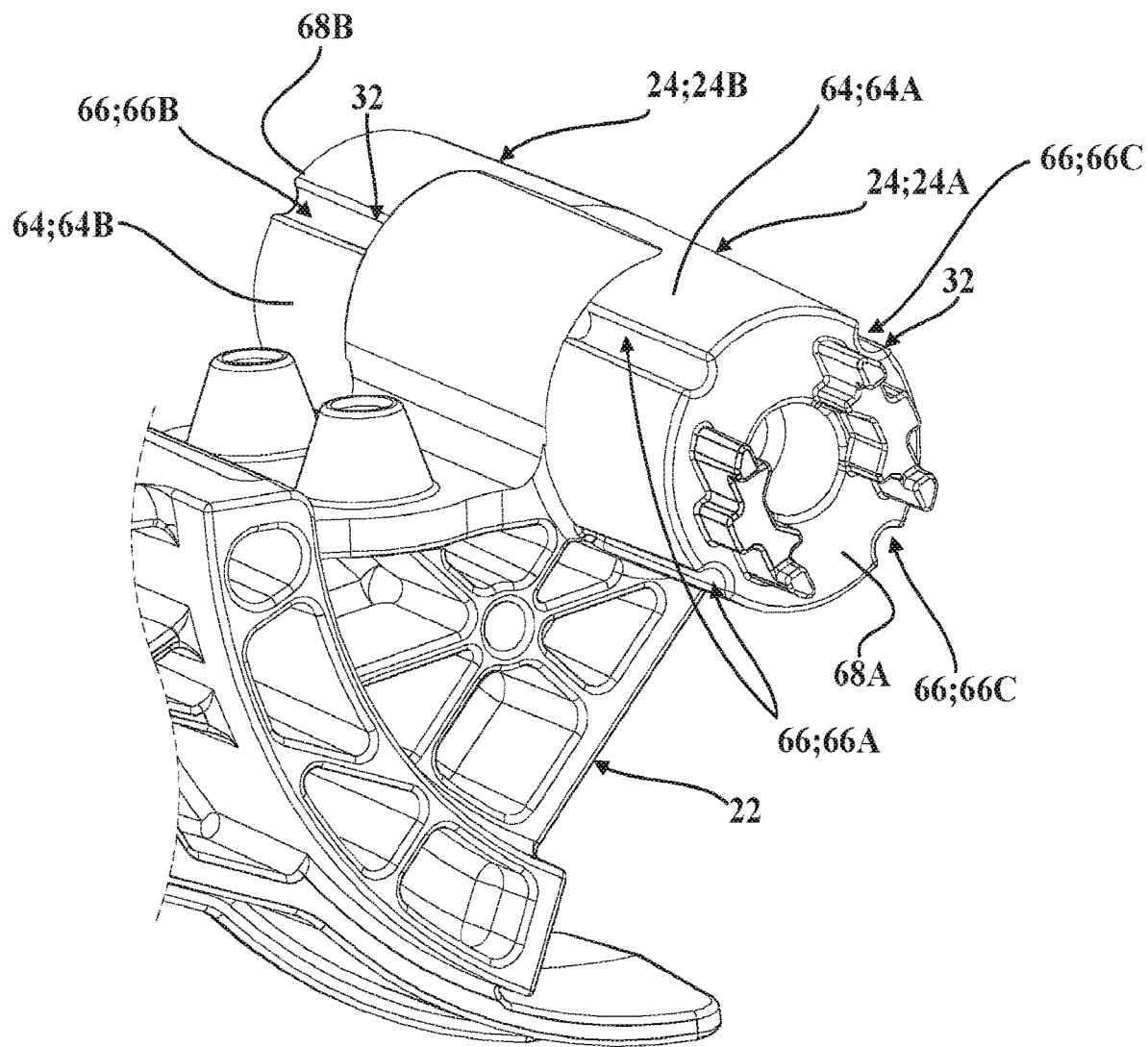
FIG. 7 is a perspective view of a portion of the pedal arm of the pedal assembly of FIGS. 1-6, showing a debris filtering mechanism formed in a pivot shaft operatively attached to the pedal arm, according to one embodiment of the present invention.
Figure 8:
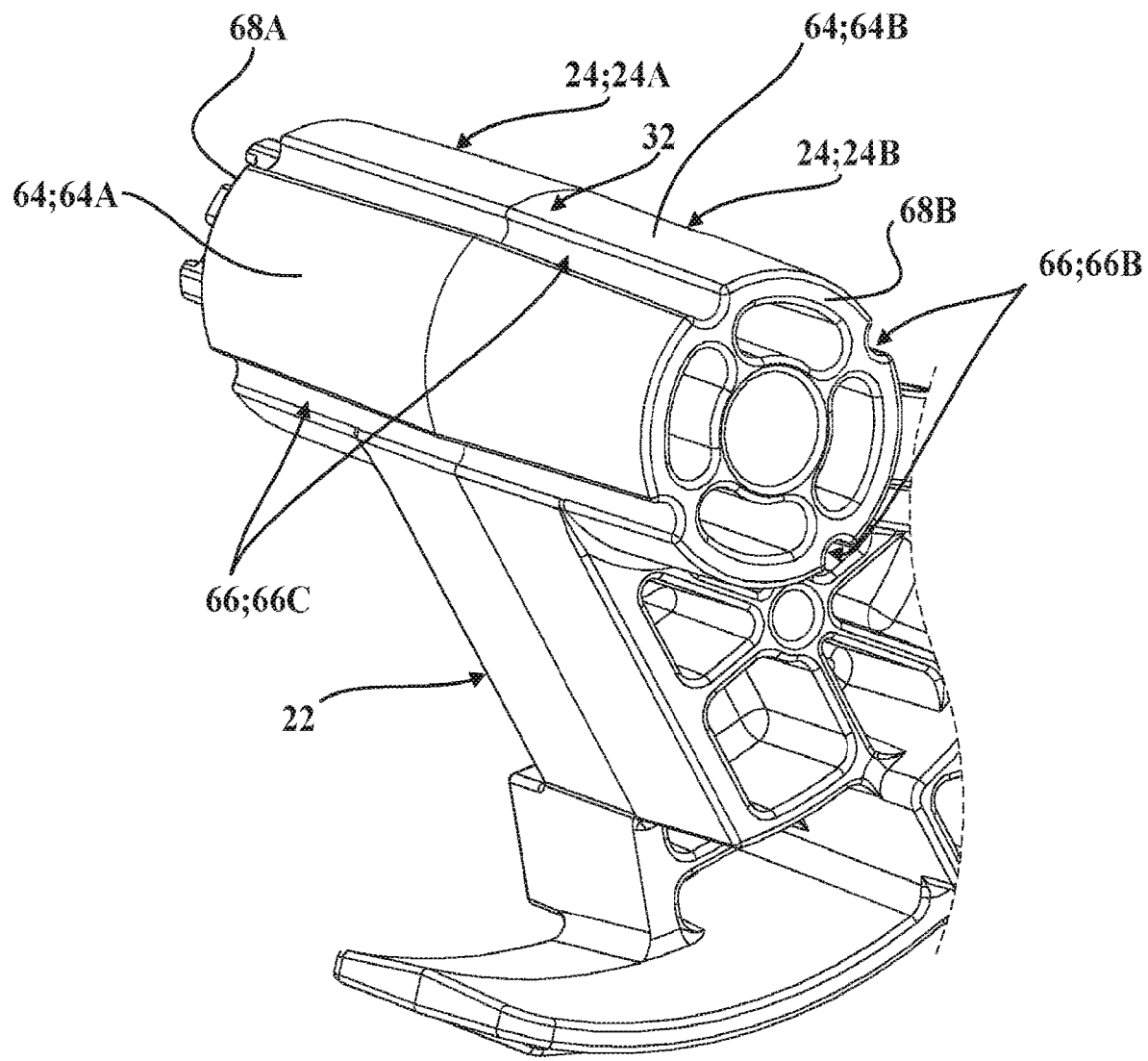
FIG. 8 another perspective view of a portion of the debris filtering mechanism depicted in FIG. 7.
Figure 9A:
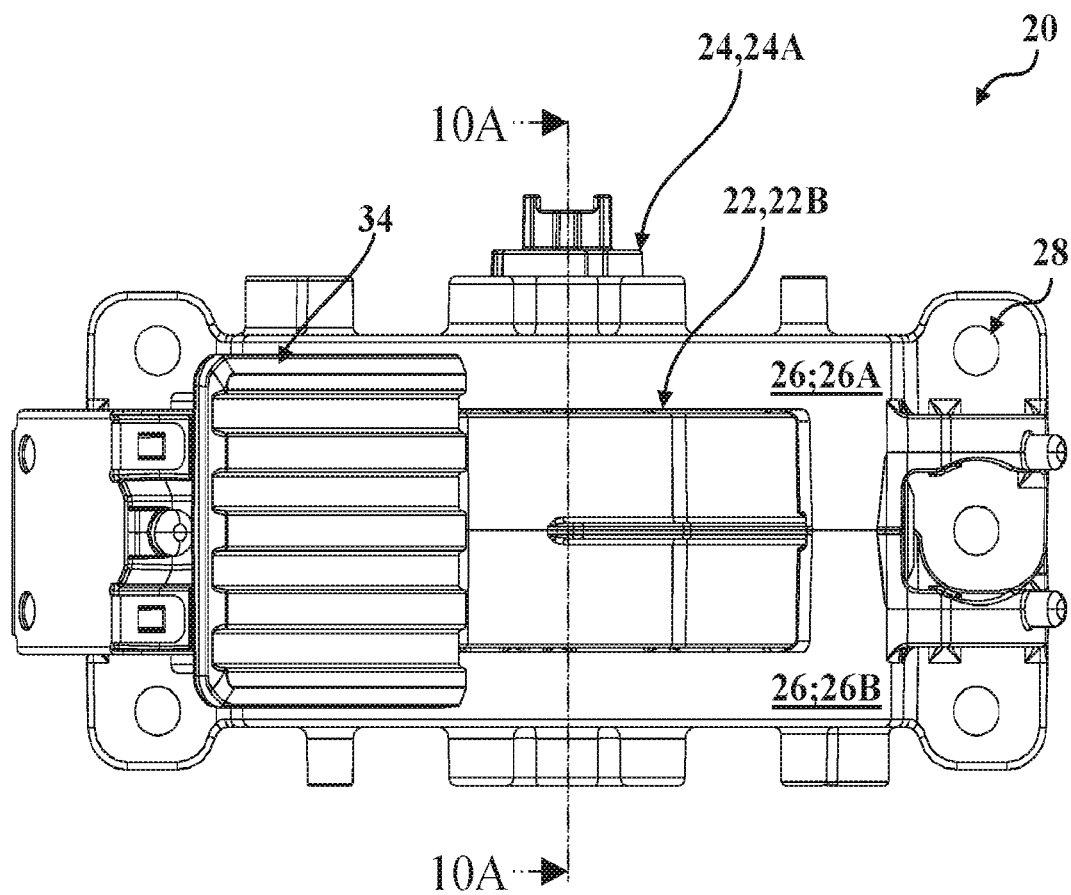
FIG. 9A is a top-side plan view of the pedal assembly of FIGS. 1-8, showing the pedal arm arranged in the first position depicted in FIG. 5A.
Figure 9B:
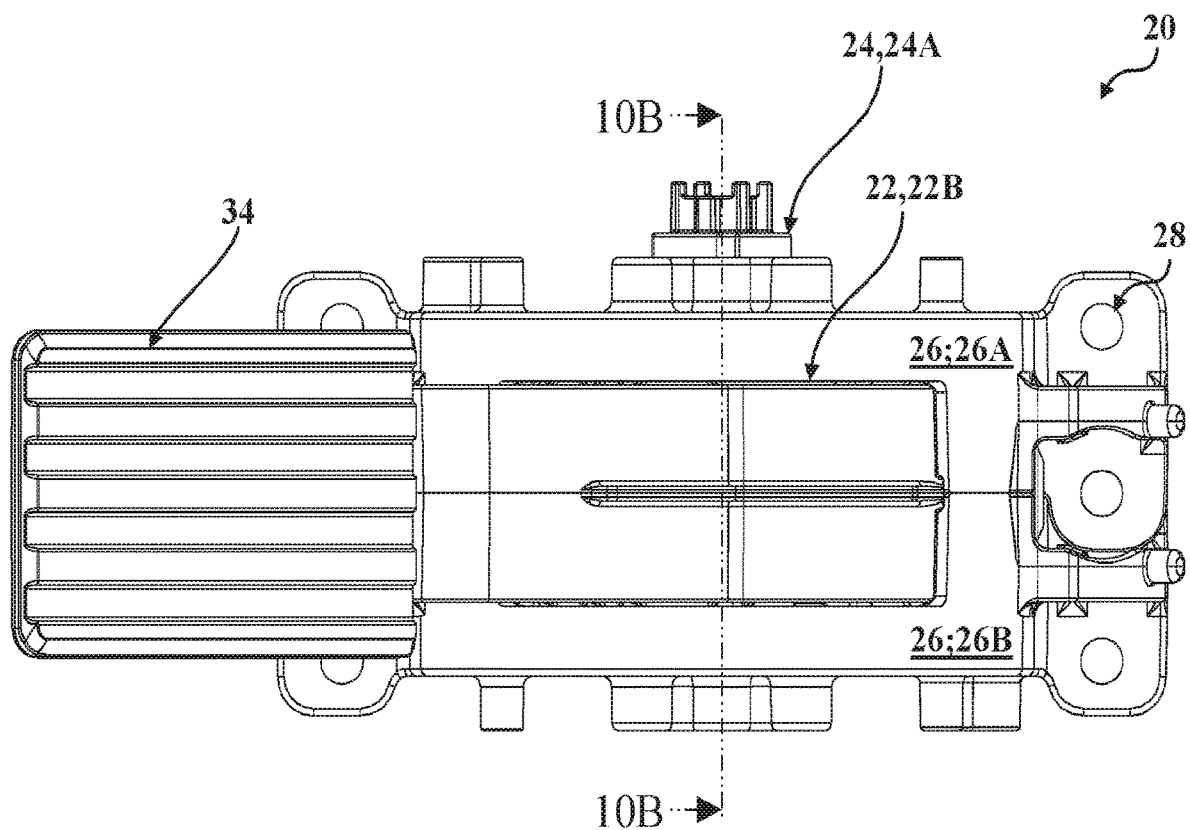
FIG. 9B is another top-side plan view of the pedal assembly of FIGS. 1-8, showing the pedal arm arranged in the second position depicted in FIG. 5B.

As noted above, the pivot shaft 24 rotates about the pivot axis PA and engages the bore 30 of the housing 26. Here, as shown in FIGS. 3, 7, and 8, the bore 30 of the housing 26 defines a bore contact surface 62 (see FIG. 3), and the pivot shaft 24 defines a shaft contact surface 64 (see FIGS. 7 and 8). More specifically, and according to the representative embodiment illustrated herein, the first bearing bore 30A of the first housing component 26A defines a first bore contact surface 62A, the second bearing bore 30B of the second housing component 26B defines a second bore contact surface 62B, the first shaft portion 24B defines a first shaft contact surface 64A, and the second shaft portion 24B defines a second shaft contact surface 64B. However, as will be appreciated from the subsequent description below, the pedal assembly 20 could employ a pivot shaft 24 which is rotatably supported by single bore 30 between which the debris filtering mechanism 32 is interposed to direct contaminants away from the pedal assembly 20, without departing from the scope of the present invention.

The respective contact surfaces 62, 64 engage each other in operation as the pivot shaft 24 rotates about the pivot axis PA. Because the pivot shaft 24 directly engages the bore 22 of the housing 24, the housing 26 and pivot shaft 24 may advantageously be manufactured from materials that facilitate smooth rotatable engagement with each other. In one embodiment, the housing 26 is manufactured from acetal and the pivot shaft 24 is manufactured from glass-filled nylon. This configuration strikes a substantial balance between low manufacturing costs and strength while, at the same time, ensuring low-friction engagement of the respective contact surfaces 62, 64 in operation. In one embodiment, as shown best in FIGS. 10 and 11, the pivot shaft 24 and the bore 30 each have corresponding frustoconical configurations. More specifically, the first shaft portion 24A and the first bore 30A each have corresponding frustoconical configurations, and the second shaft portion 24B and the second shaft 30B each have corresponding frustoconical configurations. To this end, as is illustrated in FIG. 10A, in one embodiment, the bore 30 of the housing 26 has a first diameter D1 adjacent to the outer surface 35B of the body 35, and the bore 30 has a second diameter D2 adjacent to the inner surface 35A of the body 35 which is greater than the first diameter D1. As will be appreciated from the subsequent description of the debris filtering mechanism 32 below, this configuration helps urge contaminants away from the inner surface 35A of the body 35 of the housing 26 and towards the outer surface 35B as the pivot shaft 24 rotates about the pivot axis PA.

It will be appreciated that proper movement of the pedal arm 22 between the first position 22A and the second position 22B in response to rotation of the pivot shaft 24 about the pivot axis PA ensures proper operation of the vehicle. Thus, smooth rotation of the pivot shaft 24 about the bearing bore 30 needs to be maintained in operation. To this end, the debris filtering mechanism 32 is employed to direct contaminants away from the pedal assembly 20 in use, as noted above. As described in greater detail below, the debris filtering mechanism 32 directs contaminants away from the pivot shaft 24 and the bore 30 that might otherwise cause extreme wear to the bore contact surface 62 and/or the shaft contact surface 64. It will be appreciated that contaminants can be introduced into contact surfaces 62, 64 of the pedal assembly 20 in operation, in particular where the vehicle is used in harsh environments. By way of non-limiting example, where the vehicle is an off-road vehicle, the pedal assembly 20 may occasionally be submerged in or otherwise exposed to a coarse slurry of water and mud/sand. As will be appreciated from the subsequent description below, the debris filtering mechanism 32 of the pedal assembly 20 of the present invention is configured to direct these contaminants away from the bore 30 and the pivot shaft 24 to minimize wear to the contact surfaces 62, 64 in operation.

As noted above, the debris filtering mechanism 32 may be formed in at least one of the pivot shaft 24 and the bore 30. As shown in FIGS. 7, 8, and 10B, in one embodiment, the debris filtering mechanism 32 comprises at least one channel, generally indicated at 66, defined in at least one of the bore 30 and the pivot shaft 24. As is best illustrated in FIG. 10B, the at least one channel 66 is arranged in communication between the inner surface 35A and the outer surface 35B of the body 35. Here, the channel 66 has a generally U-shaped profile and is both shaped and arranged so as to accommodate contaminants and to direct contaminants away from the pedal assembly 20.

In the representative embodiment illustrated in FIGS. 1-10B, the debris filtering mechanism 32 is realized as a plurality of channels 66 formed in the pivot shaft 24 and radially spaced about the pivot axis PA. As is shown best in FIGS. 7 and 8, the pivot shaft 24 extends between opposing first and second shaft ends 68A, 68B, and employs a total of six channels 66 formed therein. Specifically, two channels 66A extend from the first shaft end 68A to the second shaft end 68B and are formed in communication across both the first shaft portion 24A and the second shaft portion 24B, two channels 66B extend from the first shaft end 68A towards the second shaft end 68B and are formed in the first shaft portion 24A but terminate before the second shaft portion 24B, and two channels 66C extend from the second shaft end 68B towards the first shaft end 68A and are formed in the second shaft portion 24B but terminate before the first shaft portion 24A. Put differently, each shaft contact surface 64 defines four channels 66 in total, two of which are common between the first shaft contact surface 64A and the second shaft contact surface 64B. Thus, in one embodiment, the debris filtering mechanism 32 includes at least one channel 66 formed in each of the shaft portions 24A, 24B. Similarly, in one embodiment, at least one of the channels 66 extends between the first bore 30A and the second bore 30B. In one embodiment, at least one of the channels 66 extends across both of the shaft portions 24A, 24B. In one embodiment, at least one of the channels 66 is discontinuous along the pivot shaft 24.

The channels 66 extend linearly with the pivot axis PA, are sized equally, and are radially spaced from each other about the pivot axis PA. In one embodiment, the channels 66 are equidistantly spaced from each other about the pivot axis PA. However, those having ordinary skill in the art will appreciate that the debris filtering mechanism 32 could include any suitable number of channels 66 spaced, arranged, or sized in any suitable way sufficient to direct contaminants away from the pedal assembly 20, without departing from the scope of the present invention.

Figure 11:
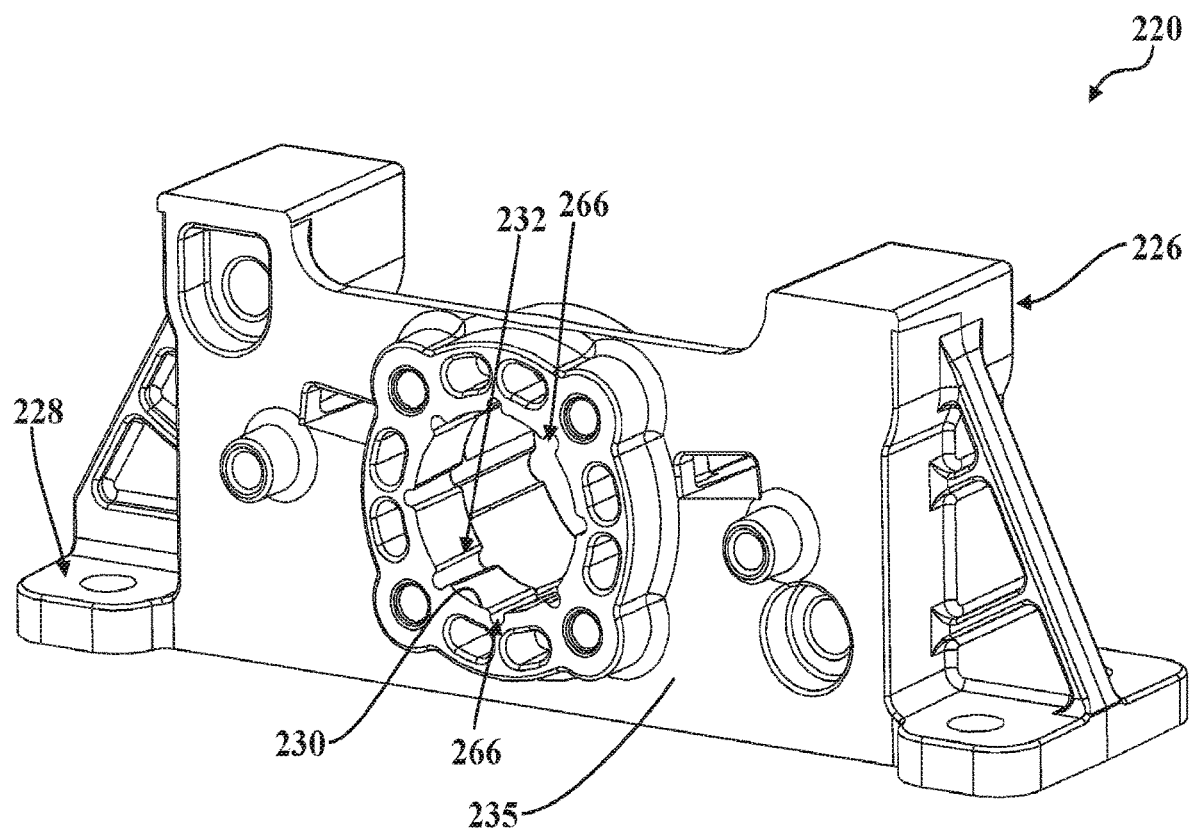
FIG. 11 is a perspective view of a housing component having a debris filtering mechanism according to another embodiment of the present invention.
Figure 12:
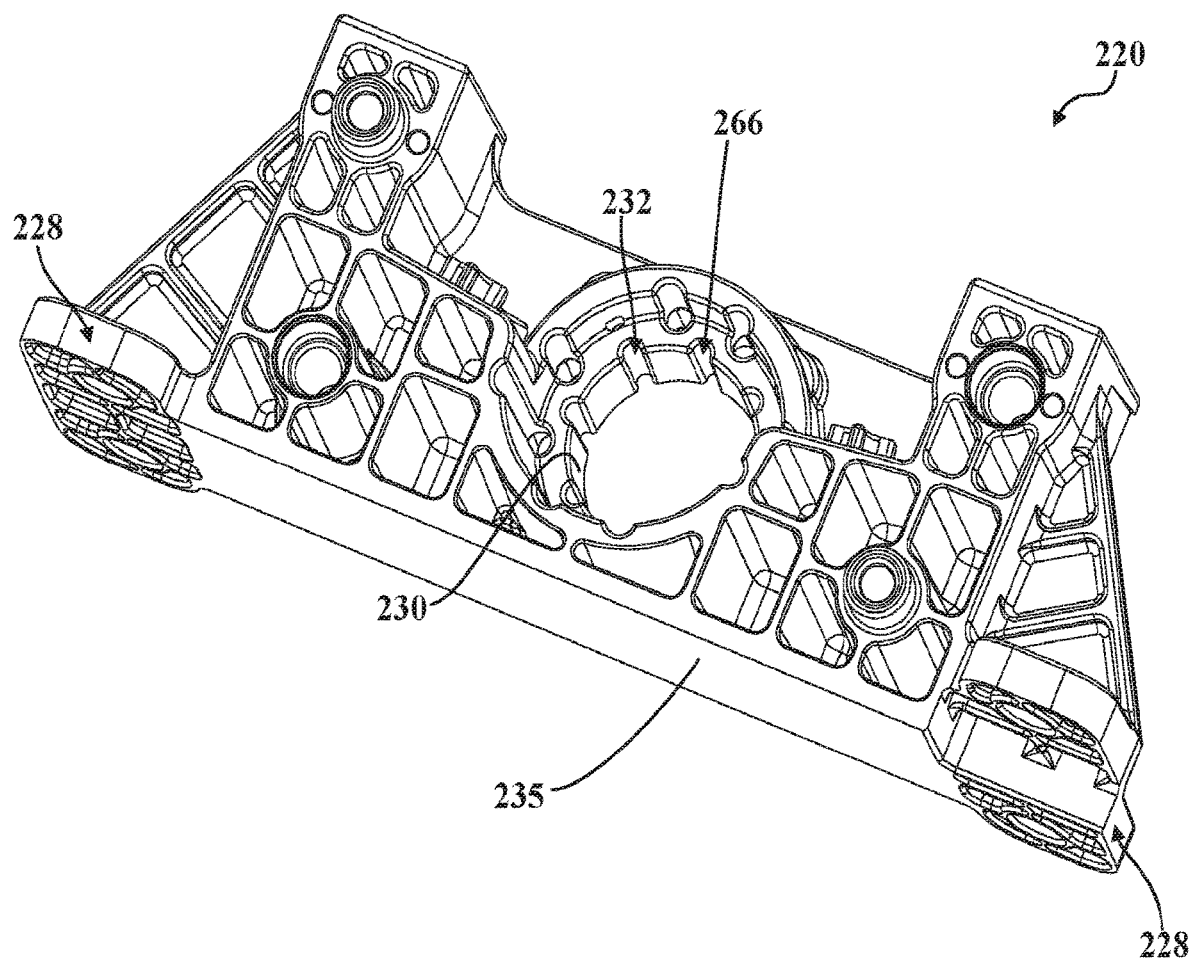
FIG. 12 is another perspective view of the housing component of FIG. 11.

As noted above, the debris filtering mechanism 32 of the pedal assembly 20 depicted in FIGS. 1-10B is formed in the pivot shaft 24. However, as noted above, the debris filtering mechanism 32 could also be formed in the bore 30 of the housing 26. To this end, FIGS. 11 and 12 depict another embodiment of the debris filtering mechanism formed in the housing. In these Figures and in description that follows, the structure and components of this embodiment that are the same as or that otherwise correspond to the structure and components of the previously-described embodiment are provided with the same reference numerals increased by 200.

Referring now to FIGS. 11 and 12, a housing 226 is shown. Here, the housing 226 includes a body 235 defining an inner surface 235A and an outer surface 235B, a mount 228 adapted for attachment to a portion of the vehicle, and a bore 230 to rotatably support a pivot shaft (not shown in FIGS. 11 and 12). The bore 230 has a frustoconical configuration defined between the inner surface 235A and the outer surface 235B. A debris filtering mechanism 232 is formed in the bore 230 and extends from the inner surface 235A to the outer surface 235B. Here, the debris filtering mechanism 232 is defined by a plurality of radially-spaced channels 266, each having a generally U-shaped profile. In this embodiment, a total of eight channels 266 are provided, each of which are shaped and arranged so as to accommodate contaminants and to direct contaminants away from the pedal assembly 220 in response to movement of the pivot shaft between the positions, as noted above in connection with the previously-described embodiment.

Those having ordinary skill in the art will appreciate that the debris filtering mechanism 32, 232 could be of any suitable configuration, and could employ any suitable number of channels 66, 266 of any suitable arrangement or configuration formed in the pivot shaft 24 and/or in the bore 30, 230, sufficient to direct contaminants away from the pedal assembly 20, 220 as the pivot shaft 24 rotates about the pivot axis PA and the pedal arm 22 moves between the first position 22A and the second position 22B.

In this way, the debris filtering mechanism 32, 232 of the pedal assembly 20, 220 of the present invention affords significant advantages in connection with vehicles which may be exposed to contaminants during use, such as off-road vehicles where the pedal assembly 20, 220 may occasionally be submerged in or otherwise exposed to a coarse slurry of water and mud/sand. Specifically, the debris filtering mechanism 32, 232 directs such contaminants away from the pedal assembly 20, 220 as the pivot shaft 24 rotates about the pivot axis PA in response to movement of the pedal arm 22 between the first position 22A and the second position 22B. Thus, contaminants which would otherwise accumulate within the pedal assembly 20 and could lead to inconsistent operation of and excessive wear to the various components of the pedal assembly 20, are directed away from the pedal assembly 20 via the debris filtering mechanism 32, 232. Moreover, those having ordinary skill in the art will appreciate that the debris filtering mechanism 32, 232 allows the pedal assembly 20, 220 to be used in harsh environments without necessitating the use of expensive components, such as sealed bearings. In light of the foregoing, it will be appreciated that the pedal assembly 20, 220 of the present invention provides improved functionality and usability in connection with vehicles and, at the same time, reduces the cost and complexity of manufacturing and assembling pedal assemblies which can operate reliably and predictably in a number of different environments.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A pedal assembly for a vehicle, comprising:
   a pedal arm moveable between a first position and a second position;
   a pivot shaft operatively attached to said pedal arm with said pivot shaft defining a pivot axis;
   a housing having a mount adapted for attachment to the vehicle, said housing defining a bore supporting at least a portion of said pivot shaft to permit rotation of said pedal arm about said pivot axis; and
   a debris filtering mechanism formed in at least one of said pivot shaft and said bore to direct contaminants away from said pedal assembly and out of said bore as said pedal arm moves between said first position and said second position;
   wherein said bore of said housing defines a bore contact surface, and wherein said pivot shaft defines a shaft contact surface shaped to rotatably engage said bore contact surface as said pedal arm moves between said first position and said second position;
   wherein said debris filtering mechanism includes at least one channel defined in, and recessed below, at least one of said bore contact surface and said shaft contact surface; and
   wherein said housing has a body defining an inner surface and an outer surface with said debris filtering mechanism arranged to direct contaminants from said inner surface towards said outer surface as said pedal arm moves between said first position and said second position, with said bore of said housing being formed between said inner surface and said outer surface, and with said bore of said housing having a first diameter adjacent to said outer surface and a second diameter adjacent to said inner surface greater than said first diameter.

2. The pedal assembly as set forth in claim 1, wherein said debris filtering mechanism comprises a plurality of channels defined in said pivot shaft.

3. The pedal assembly as set forth in claim 1, wherein said debris filtering mechanism comprises a plurality of channels defined in said bore of said housing.

4. The pedal assembly as set forth in claim 1, wherein said at least one channel is arranged in communication between said inner surface and said outer surface.

5. The pedal assembly as set forth in claim 1, wherein said bore of said housing and said pivot shaft each have a frustoconical configuration.

6. The pedal assembly as set forth in claim 1, wherein said debris filtering mechanism includes a plurality of channels circumferentially spaced about said pivot axis.

7. The pedal assembly as set forth in claim 1, wherein said at least one channel has a generally U-shaped profile.

8. The pedal assembly as set forth in claim 1, wherein said housing is further defined as a first housing component, and said bore is further defined as a first bore; and
   further including a second housing component defining a second bore supporting at least a portion of said pivot shaft to permit rotation of said pedal arm about said pivot axis.

9. The pedal assembly as set forth in claim 8, wherein said pivot shaft includes:
   a first shaft portion associated with said first bore of said first housing component, and
   a second shaft portion associated with said second bore of said second housing component.

10. The pedal assembly as set forth in claim 9, wherein said first shaft portion and said second shaft portion each have a frustoconical configuration.

11. The pedal assembly as set forth in claim 9, said at least one channel is formed in each of said first shaft portion and said second shaft portion.

12. The pedal assembly as set forth in claim 11, wherein said at least one channel includes a plurality of channels with at least one channel extending entirely across said first and second shaft portions.

13. The pedal assembly as set forth in claim 12, wherein at least one channel of said plurality of channels is discontinuous across said pivot shaft.

14. The pedal assembly as set forth in claim 1, further including a biasing element interposed in force-translating relationship between said pedal arm and said housing with said biasing element configured to urge said pedal arm to said first position.

15. The pedal assembly as set forth in claim 1, further including a rotational position sensor operatively attached to said housing and disposed in rotational communication with said pivot shaft.

16. The pedal assembly as set forth in claim 15, wherein said rotational position sensor includes at least one emitter adapted for attachment to said pivot shaft to communicate with said rotational position sensor.

17. The pedal assembly as set forth in claim 1, wherein said pivot shaft extends between opposing first and second shaft ends; and
   wherein said at least one channel is formed in said pivot shaft with said at least one channel extending along said pivot shaft from said first shaft end to said second shaft end.

18. A pedal assembly for a vehicle, comprising:
   a pedal arm moveable between a first position and a second position;
   a pivot shaft operatively attached to said pedal arm with said pivot shaft defining a pivot axis;
   a housing having a mount adapted for attachment to the vehicle, and said housing having a body defining an inner surface and an outer surface, said housing defining a bore formed between said inner surface and said outer surface with said bore supporting at least a portion of said pivot shaft to permit rotation of said pedal arm about said pivot axis; and a debris filtering mechanism formed in at least one of said pivot shaft and said bore with said debris filtering mechanism having at least one channel extending along said pivot axis from said inner surface to said outer surface and arranged in communication between said inner surface and said outer surface to direct contaminants from said inner surface towards said outer surface away from said pedal assembly and out of said bore as said pedal arm moves between said first position and said second position.

19. The pedal assembly as set forth in claim 18, wherein said at least one channel is defined in at least one of said bore and said pivot shaft.

20. The pedal assembly as set forth in claim 19, wherein said at least one channel has a generally U-shaped profile.

21. A pedal assembly for a vehicle, comprising:
  a pedal arm moveable between a first position and a second position;
  a pivot shaft operatively attached to said pedal arm with said pivot shaft defining a pivot axis;
  a housing having a mount adapted for attachment to the vehicle, said housing defining a bore supporting at least a portion of said pivot shaft to permit rotation of said pedal arm about said pivot axis; and
  a debris filtering mechanism formed in at least one of said pivot shaft and said bore to direct contaminants away from said pedal assembly and out of said bore as said pedal arm moves between said first position and said second position;
  wherein said bore of said housing defines a bore contact surface, and wherein said pivot shaft defines a shaft contact surface shaped to rotatably engage said bore contact surface as said pedal arm moves between said first position and said second position;
  wherein said debris filtering mechanism includes at least one channel defined in, and recessed below, at least one of said bore contact surface and said shaft contact surface; and
  wherein said at least one channel has a generally U-shaped profile.

\* \* \* \* \*

UNITED STATES PATENT AND TRADEMARK OFFICE
CERTIFICATE OF CORRECTION

PATENT NO. : 10,551,866 B2
APPLICATION NO. : 15/760347
DATED : February 4, 2020
INVENTOR(S) : Jesse L. Henrikson It is certified that error appears in the above-identified patent and that said Letters Patent is hereby corrected as shown below:

In the Claims

Column 10, Line 25, (approx.) Claim 11, please replace "in claim 9, said at least" with --in claim 9, wherein said at least--

Signed and Sealed this
Tenth Day of November, 2020

Andrei Iancu
*Director of the United States Patent and Trademark Office*